United States Patent [19]
Wright

[11] Patent Number: 5,309,664
[45] Date of Patent: May 10, 1994

[54] RADIO-CONTROLLED FISHING BOAT

[75] Inventor: Jerry C. Wright, Gainesville, Ga.

[73] Assignee: Robo Fishing, Inc., Woodstock, Ga.

[21] Appl. No.: 78,046

[22] Filed: Jun. 18, 1993

[51] Int. Cl.⁵ .............................................. A01K 89/00
[52] U.S. Cl. ........................................................ 43/26.1
[58] Field of Search ............................ 43/26.1, 3, 4, 4.5, 43/17, 19.2, 15; 446/160, 163, 164, 165; 114/255

[56] References Cited

U.S. PATENT DOCUMENTS

| | | | |
|---|---|---|---|
| 3,074,195 | 1/1963 | Vanderpool | 43/3 |
| 3,397,668 | 8/1968 | Mainguy | 446/163 |
| 3,689,927 | 9/1972 | Boston | 43/3 |
| 3,793,761 | 2/1974 | Bonham | 43/26.1 |
| 4,161,077 | 7/1979 | Ciaccio et al. | 43/26.1 |
| 4,253,165 | 2/1981 | Christiansen | 43/26.1 |
| 4,270,307 | 6/1981 | Arigaya | 446/163 |
| 4,339,811 | 7/1982 | Bednarz et al. | 43/26.1 |
| 4,339,888 | 7/1982 | Sheng-Jung | 43/26.1 |
| 4,376,350 | 3/1983 | Bednarz et al. | 43/26.1 |
| 4,680,885 | 7/1987 | Lindell et al. | 43/26.1 |
| 4,757,633 | 7/1988 | Van Cleve | 43/26.1 |
| 4,829,695 | 5/1989 | Hoecherl | 43/3 |
| 5,154,016 | 10/1992 | Fedora et al. | 43/4 |
| 5,203,729 | 4/1993 | Beller et al. | 446/163 |

Primary Examiner—Paula A. Bradley
Assistant Examiner—Chuck Y. Mah
Attorney, Agent, or Firm—James A. Hinkle

[57] ABSTRACT

A remote-control fishing vessel has a trip-release pole to jerk line for engagement of a hook in a fish that nibbles bait, a motorized reel with optional spring tension, a broad transom and an optional water anchor constructed to resist reverse drag by a hooked fish, steering with dual water screws to obviate need for a rudder, a deep-ballast hull with water-resistant sections to provide unsinkable stability and an optional top float to restore upright position of the vessel in the event it were capsized.

50 Claims, 6 Drawing Sheets

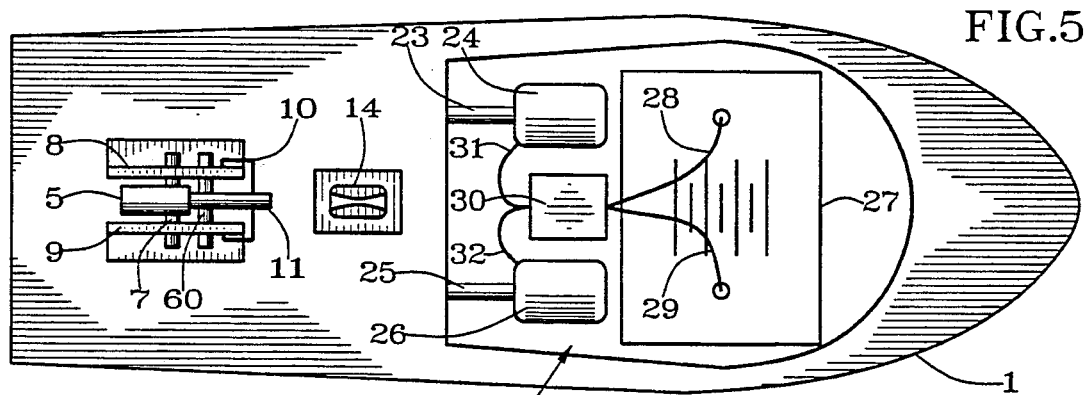
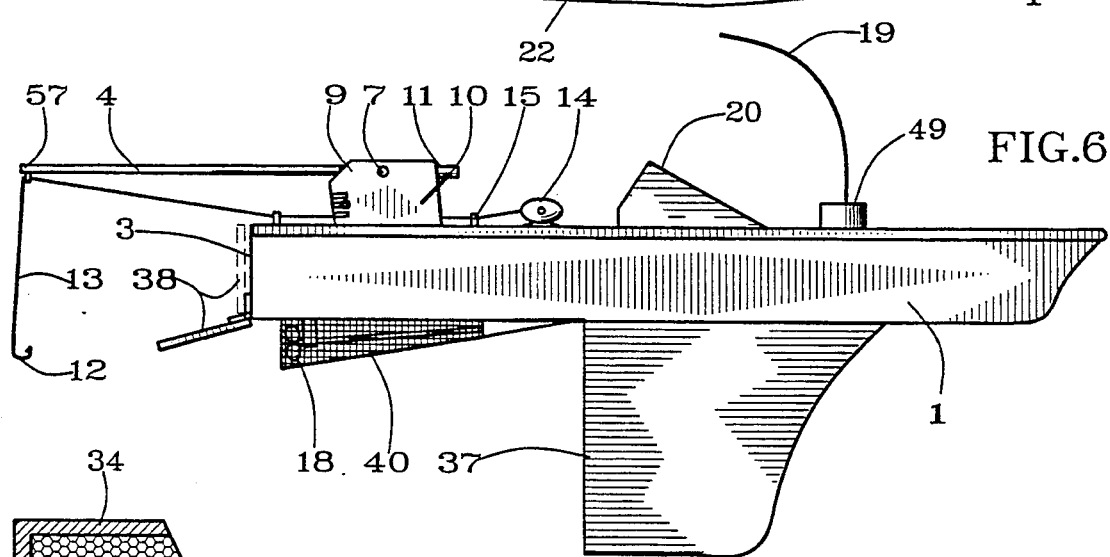
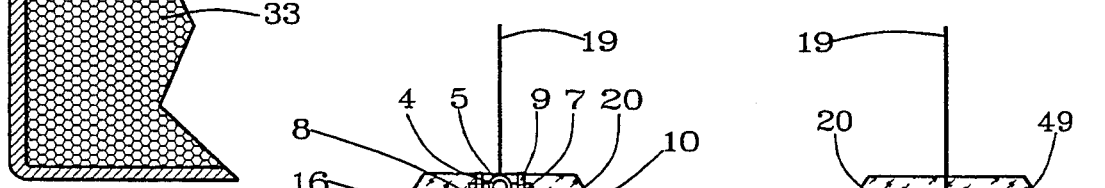
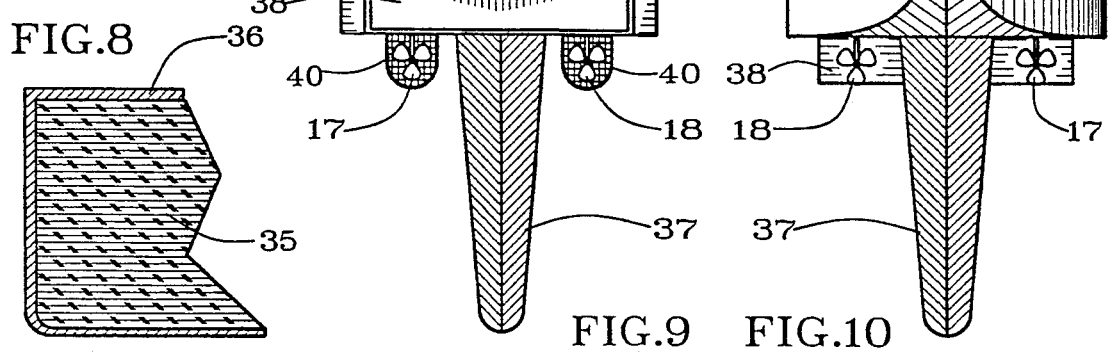

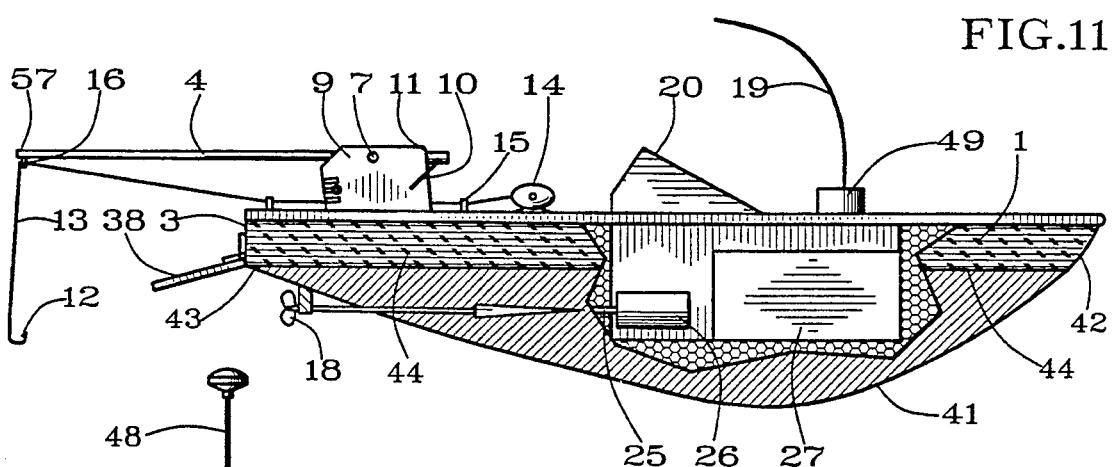
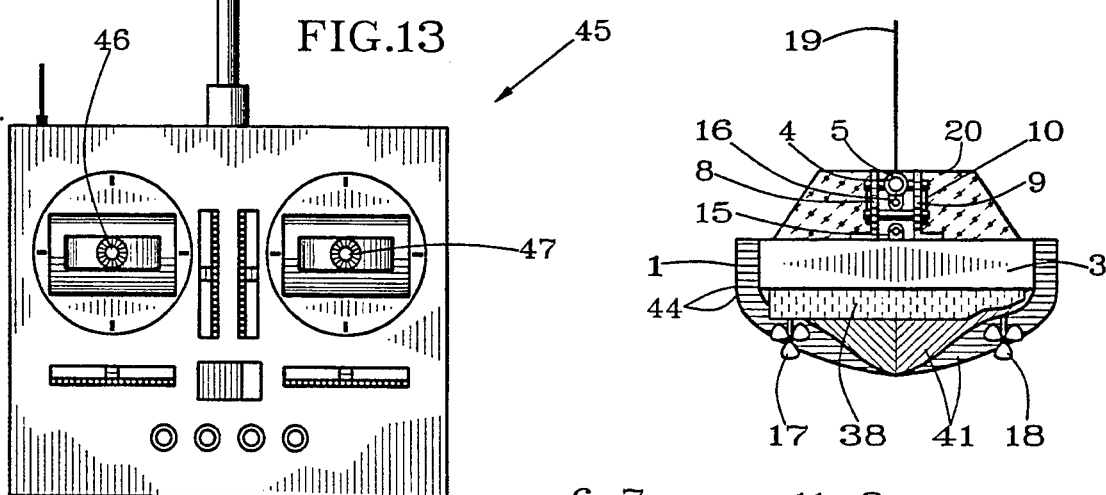
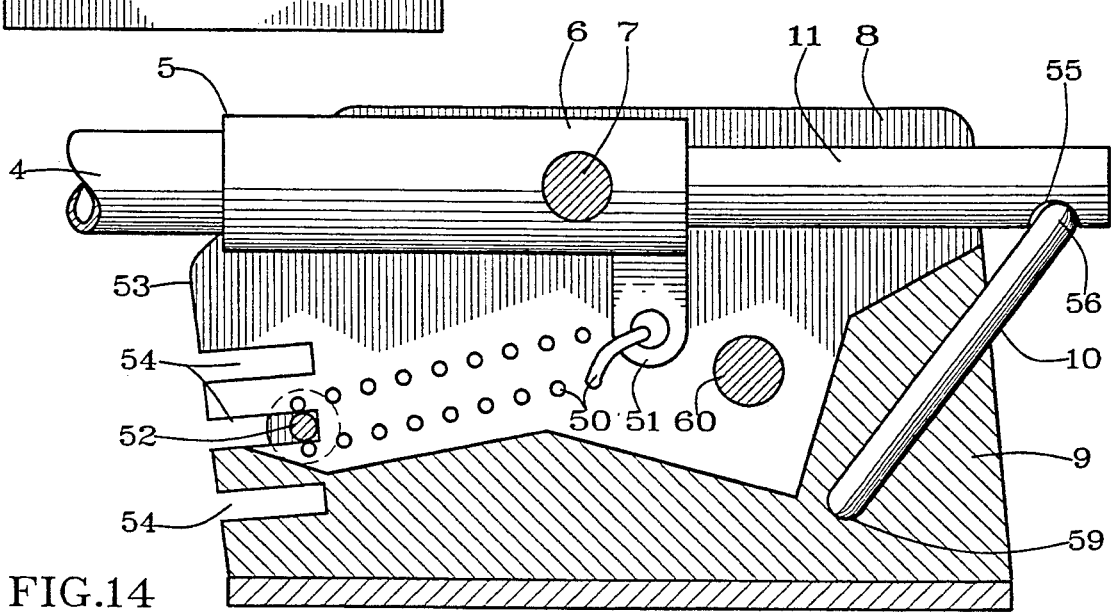

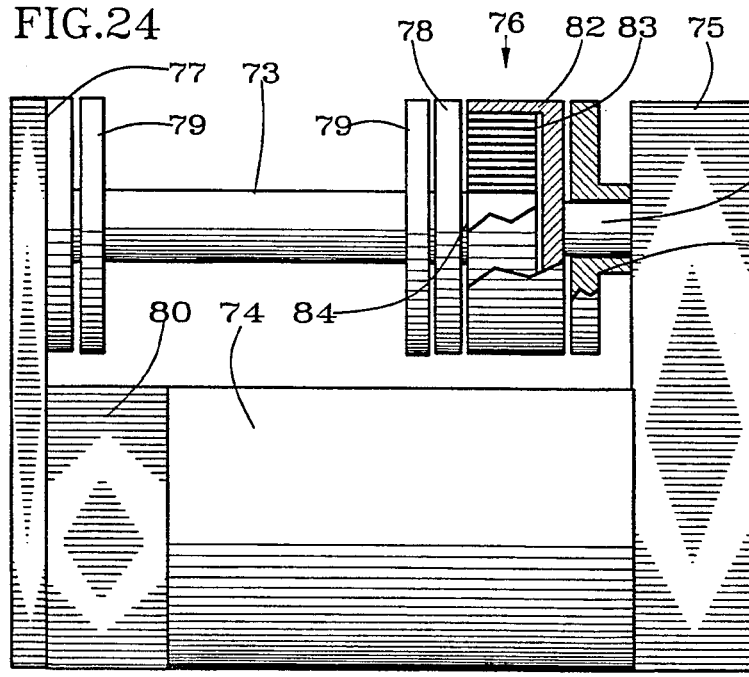
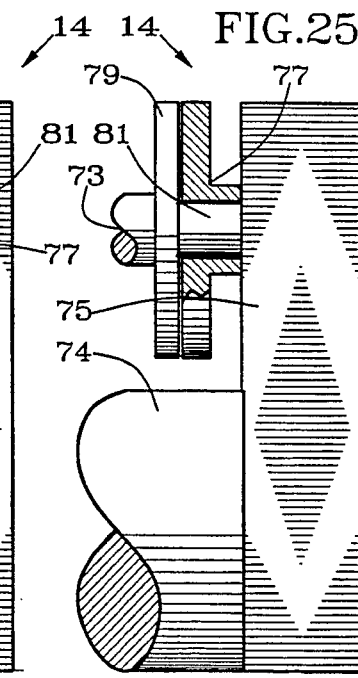
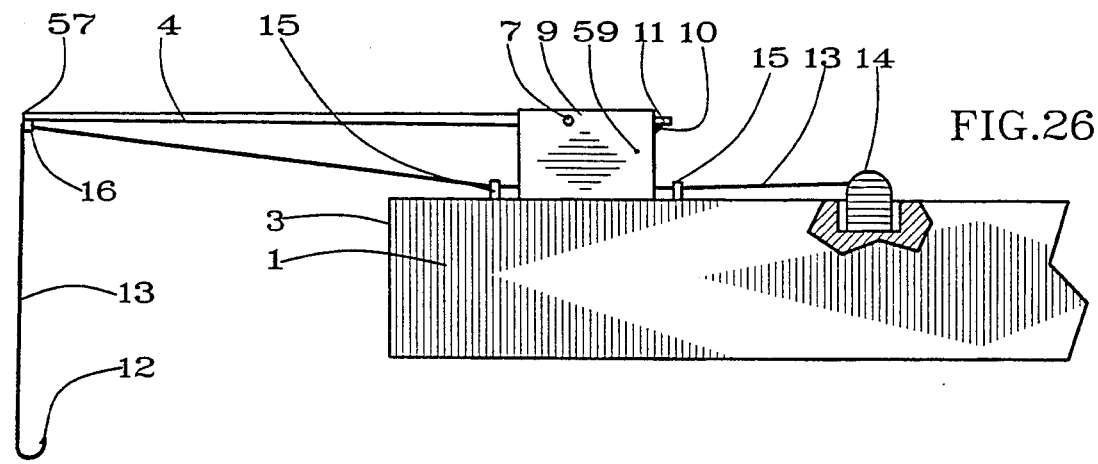
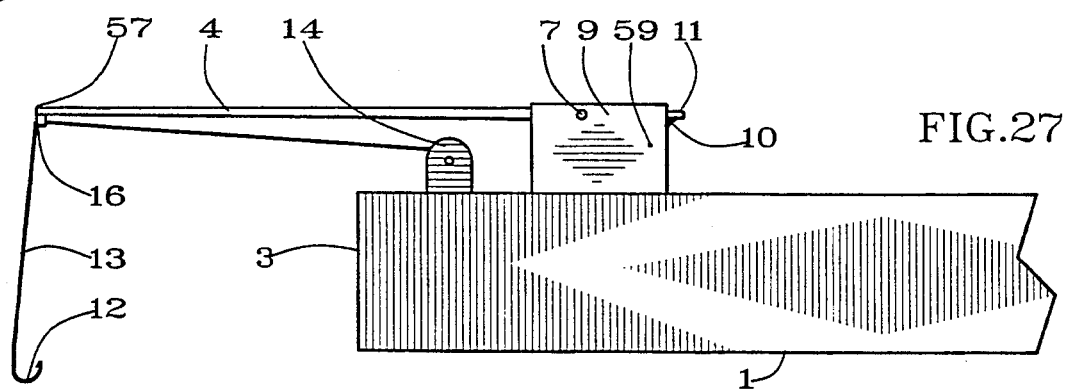

RADIO-CONTROLLED FISHING BOAT

BACKGROUND OF THE INVENTION

I. Field of the Invention.

The present invention relates generally to the field of mini fishing vessels which can be maneuvered, operated and controlled remotely through radio signals.

II. Description of the Prior Art.

It has long been a desire of fishermen to send out a little fishing tool under their remote control to catch fish in any place and at any time where fish were feeding without them getting away. It has been tried before but not with the self-catching fishing tackle, remote reset, remote reel control, remote directional propulsion and related features of this invention.

An example of a different remote-control fishing vessel is described in U.S. Pat. No. 4,161,077 granted to Ciaccio et al. The Ciaccio et al patent taught a toy marine vessel that doubled as a remote-control fishing vessel. An angler held a reel portion of fishing tackle while the toy marine vessel carried a hook portion of the line to where fish were to be caught in a body of water. Then the hook portion of line held at the vessel would be released in desired timing with biting of bait on a hook, leaving the angler to manipulate the line thereafter for drawing in a fish on a hook end of the line. It was, in effect, a means for casting a line in a desired position on a body of water with the toy marine vessel being employed as a mobile casting tool.

U.S. Pat. No. 3,793,761 granted to Bonham disclosed a battery-powered fishing vessel that was remotely steered by a line held by an operator and connected to the vessel. A tug or a jerk of the line was used to steer the vessel in accordance with design of an indexed steering mechanism on the vessel. Different from this invention, the Bonham device had no autohook fishing pole and was steerable by a rudder instead of by variable rotation of a water screw on each side of the vessel. A variety of other motorized fishing aids are known but are further yet different from this invention.

SUMMARY OF THE INVENTION

In accordance with the present invention, it is contemplated that in light of problems that have existed and that continue to exist in using motorized fishing aids, objectives of this invention are to provide a remote-control fishing vessel which:

Provides automatic hook-jerking action to assure hooking action of a hook when bait on the hook is nibbled by a fish;

Provides optionally automatic and remote control of line tension to prevent line breakage or dislodgment of hooks from mouths of fish;

Provides optionally remote resetting of hook-jerking action;

Has a means of propulsion which can be operated in proximity to any type of marine plants and debris without being entangled or otherwise fowled up;

Has a steering means which is not easily obstructed by marine plants and debris;

Has a water-anchor transom which can resist pull of fish hooked on a line extended from the vessel sufficiently to tire the fish without excessive dragging of the vessel;

Is economical to construct, to tool and to operate;

Can be built in any size for any type of fishing in any type of marine environment from fishing in mountain streams or lakes to fishing in rough deep ocean and off-shore locations;

Has unsinkable buoyancy;

Has ballast and float relationships that will assure upright positioning of the vessel during any normal fishing activity and after any abnormal fishing activity for which a particular vessel is designed; and Has quick-release attachment of components for speed, convenience and low cost of tooling, maintenance and operation.

This invention accomplishes the above and other objectives with a remote-control fishing vessel having a trip-release pole to jerk line for engagement of a hook in a fish that nibbles bait, a motorized reel with optional spring tension, a broad transom and an optional water anchor constructed to resist reverse drag by a hooked fish, steering with dual water screws to obviate need for a rudder, a deep-ballast hull with water-resistant sections to provide unsinkable stability and an optional top float to restore upright position of the vessel in the event it were capsized. The invention further accomplishes all of these objects by means of a remote radio-controlled apparatus without any physical control between the fisherman and the fishing vessel.

Other objects, advantages and capabilities of the invention will become apparent from the following description taken in conjunction with the accompanying drawings showing preferred embodiments of the invention.

BRIEF DESCRIPTION OF THE DRAWINGS

FIG. 5 is a top view with a top cover removed and with the autohook fishing pole removed from a pole-cocking mechanism. Shown also in this illustration are a power source and motors for twin screws that are employed for both guidance and propulsion.

FIG. 6 is a side elevation view of an embodiment having a ballast extended from a buoyant hull. Also shown are a water-anchor plate to restrain rearward pull by a hooked fish and screen surrounding water screws to prevent clogging with water plants and debris.

FIG. 7 is a sectional view of foamed or other floatation material from which the buoyant hull can be constructed. It can be covered with impervious coating that can be employed as an exoskeleton to which components can be attached.

FIG. 8 is a sectional view of wood, cork or other natural material from which the buoyant hull can be constructed. It also can be covered with an impervious exoskeleton to which components can be attached.

FIG. 9 is a rear elevation view of the FIG. 6 illustration.

FIG. 10 is a front elevation view of the FIG. 6 illustration.

FIG. 11 is a cutaway side elevation view of an embodiment having a double-ended bottom with a dihedral curve both vertically and linearly as a ballast. A power source is shown in a cutaway section.

FIG. 12 is a rear elevation view of the FIG. 11 illustration.

FIG. 13 is a front elevation view of a conventional transmitter that can be employed as a remote controller for remote-controllable components.

FIG. 14 is a cutaway side view of a cocking mechanism for an autohook fishing pole.

FIG. 24 is a partial cutaway side view of a motorized reel having a torsion spring drive.

FIG. 25 is a partial cutaway side view of a motorized reel having a straight drive.

FIG. 26 is a rear sectional view of a buoyant hull having a motorized reel mounted linearly in front of the a pole-cocking mechanism. The reel is shown optionally countersunk in the buoyant hull.

FIG. 27 is a rear sectional view of a buoyant hull having a motorized reel mounted linearly aft of a pole-cocking mechanism optionally.

DESCRIPTION OF THE PREFERRED EMBODIMENTS

Figure 1:
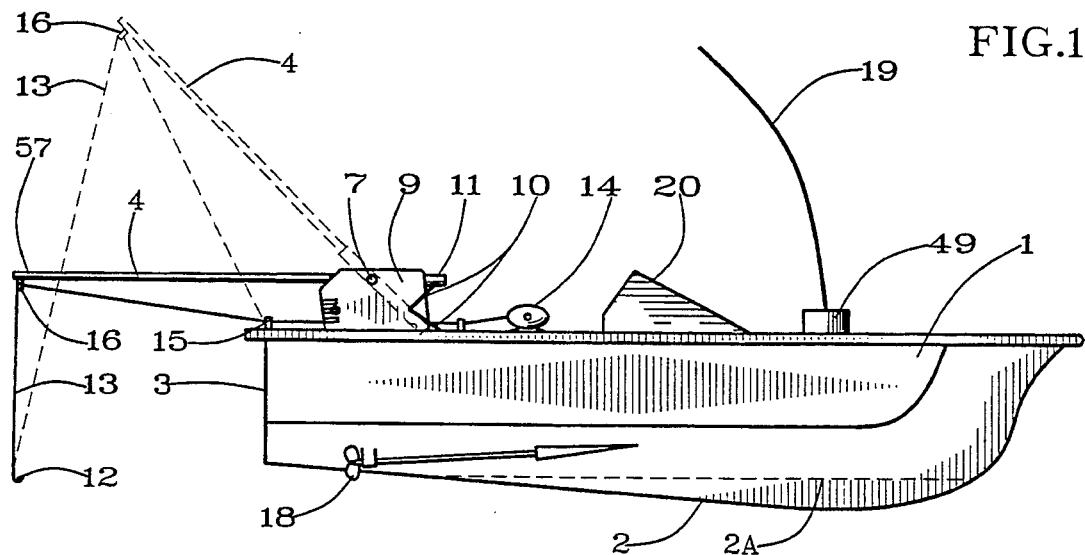
FIG. 1 is a side elevation view. It shows an autohook fishing pole in a cocked position with solid lines and in a fish-towing position by broken lines.
Figure 2:
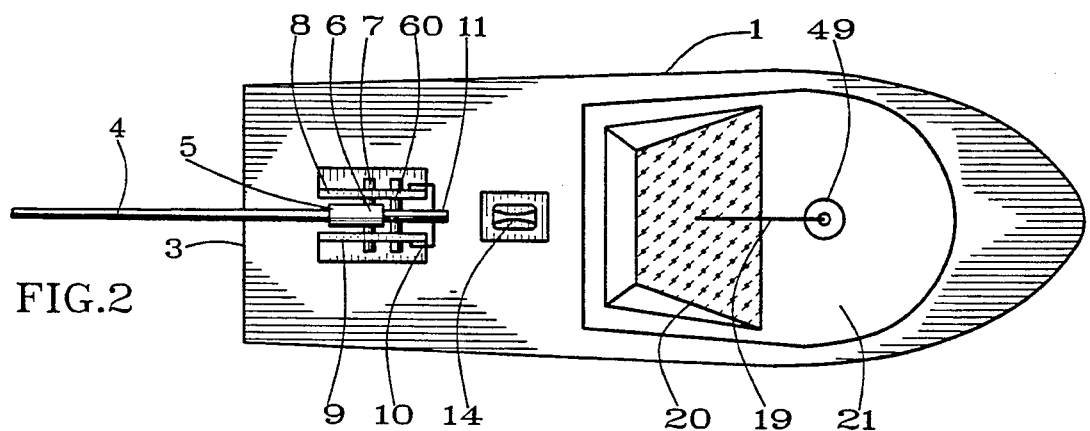
FIG. 2 is a top view of the FIG. 1 illustration with the autohook fishing pole in a cocked position.
Figure 3:
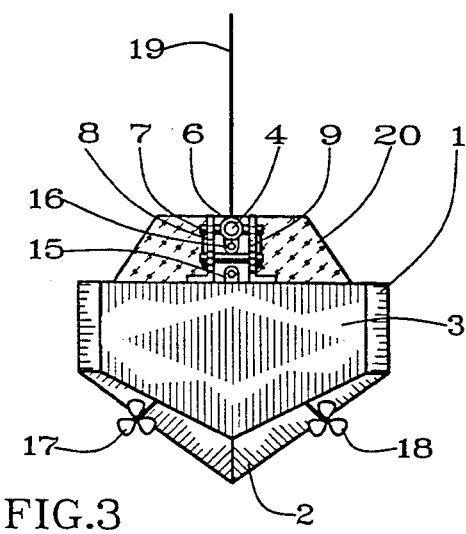
FIG. 3 is a rear elevation view of the FIG. 2 illustration.
Figure 4:
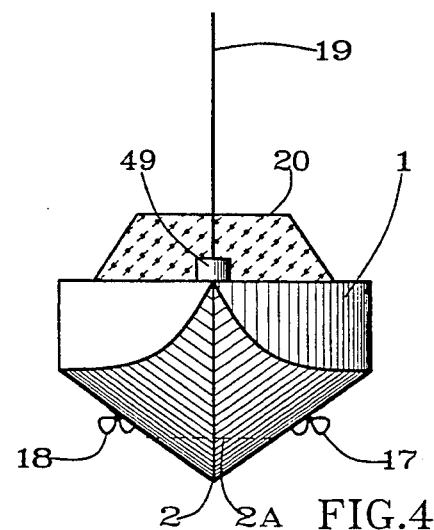
FIG. 4 is a front elevation view of the FIG. 2 illustration.

Referring to the drawings wherein like reference numerals designate corresponding parts throughout the several figures, reference is made first to FIGS. 1–4. A remote-control fishing vessel has a buoyant hull 1 with a V-bottom ballast 2 and a broad transom 3. Ballast weight concentration can be construction material or separate high-density material such as lead or cement. Construction material can be resin-impregnated fibers surrounding floatation material in relatively greater bulk at bottom sections of a V-bottom ballast 2 indicated by a broken line 2A.

An autohook fishing pole 4 is attachable to a distal end 5 of a pole rod 6 with a pole-rod axle 7 that is pivotal in relation to a first pole support 8 and a second pole support 9. A pole-rod latch 10 is attachable pivotally to the pole supports 8 and 9. The pole-rod latch 10 is pivoted upward and positioned under a proximal end 11 of the pole rod 6 to maintain the pole rod 6 and the attached autohook fishing pole 4 in a cocked position against downward pressure exerted by spring tension on the proximal end 11 of the pole rod 6 from between the pole supports 8 and 9.

Biting by a fish on a fishhook 12 attached to a fishing line 13 suspended from the autohook fishing pole 4 lowers the autohook fishing pole 4 slightly and thereby raises the proximal end 11 of the pole rod 6 to disengage the pole-rod latch 10 from the proximal end 11 of the pole rod. This allows the pole-rod latch 10 to fall towards the buoyant hull 1 and thereby permits the stored spring tension to pull the proximal end 11 downwardly to allow autohook fishing pole 4 and the pole rod 6 to which it is attached to pivot upward with a jerk of the fishing line 13 that jerks and automatically hooks a fish biting on fishhook 12.

Fishing line 13 is wound on reel 14 that is attachable to the buoyant hull linearly in front of or aft of the pole supports 8 and 9. When the reel 14 is mounted in front of the pole supports 8 and 9, the fishing line is routed through hull line eyes 15 and at least one pole line eye 16.

A first water screw 17 and a second water screw 18 are suspended from opposite sides of the buoyant hull 1. Independent speed control and directional rotation of the water screws 17 and 18, referred to also as twin screws 17 and 18, provides steering which obviates need for a rudder.

Also provided by twin screws 17 and 18 is resistance to rearward pull of a fish hooked on fishhook 12. Resisting rearward pull of fish in addition is the broad transom 3. Rearward positioning of the autohook fishing pole assures that pulling of a fish hooked on fishhook 12 will result in rearward rather than forward or side pull of the buoyant hull 1.

Remote control of the twin screws 17 and 18 is provided by radio waves to receiver antenna 19. Further explanation of remote controls and control mechanisms is provided in relation to following figures.

A watertight top compartment 20 is attached to a top cover 21. The watertight top compartment 20 can be shaped to resemble a cabin on a boat. Functionally, however, it can be made to provide top buoyancy for instability of the buoyant hull in a capsized attitude such that the ballast 2 can be employed to restore upright attitude from an inadvertent capsized position due to abnormal operating conditions.

Referring to FIG. 5, a buoyant hull 1 with the top cover 21 removed reveals a propulsion-power package 22. A first twin-screw shaft 23 is attached rotatively to a first twin-screw motor 24. A second twin-screw shaft 25 is attached rotatively to a second twin-screw motor 26. The twin-screw motors 24 and 26 can be either electrical motors for some applications or prime-mover engines for other applications. Particularly for relatively large seaworthy remote-control fishing vessels, prime-mover engines can be employed. Power can be stored in power container 27 that is a storage battery for use of electrical motors as twin-screw motors 24 and 26 or that is a fuel tank for use of prime-mover engines as twin-screw motors 24 and 26.

Whether electrical current for electrical or fuel for engine-prime-mover twin-screw motors 24 and 26, power-supply lines 28 and 29 are employed to convey the electrical current or fuel respectively from the power container 27 to a central distribution controller 30 and then to either or both of the twin-screw motors 24 and 26 through controlled-power lines 31 and 32 as desired. Return electrical lines for electrical motors and fuel inlet ports for either type of power source are assumed. The central distribution controller 30 is directed through the receiver antenna 19 described in relation to FIGS. 1-4 above and in relation to FIGS. 11-13 for controlling speed and rotational direction of the twin-screw motors 24 and 26 to maneuver the remote-control fishing vessel as desired.

Referring to FIGS. 6-10, a buoyant hull 1 can be made of a foamed or cellular floatation material 33 that can be covered by a water-impervious material 34 that can be used as an exoskeleton to which components are attachable. Alternatively, the buoyant hull 1 can be constructed of wood, cork or other natural flotation material 35. The natural flotation material 35 also can be covered by a suitable although generally different type of natural-material exoskeleton 36 to which components are attachable. Some woods are sturdy enough not to need an exoskeleton 36 for attachment of components but are heavier for consideration in design tradeoffs.

For some use-conditions and applications, the buoyant hull 1 can be a relatively flat buoyant material 33 or 35 to which a separate ballast 37 is attachable. The separate ballast 37 is a form of V-bottom ballast 2 described in relation to FIGS. 1-4. Even a simple board as a buoyant hull 1 with metal plate having a base attached vertically to a bottom side as a V-bottom ballast 3 is foreseeable for some simple and inexpensive forms and applications of this invention.

To replace or to supplement a water-anchor effect of a V-shaped hull 1 having a broad transom 3, a transom-plate 38 can be extendable variously from the broad transom 3. In FIGS. 6 and 10, the transom plate 38 is shown hinged to a bottom of the broad transom 3. It can be made to float with a tip end slightly submerged. In dashed lines in FIG. 6 and in solid lines in FIG. 9, the transom plate 38 is shown swivelled up against the broad transom 3.

Rearward travel of the buoyant hull 1 causes the broad transom 3 and the entire stern 39 of the buoyant hull 1 to submerge as a result of a downward-entry angle of the transom plate 38. Together, the broad transom 3 and the transom plate 38 comprise a water anchor with a snow-shovel effect that is very effective against pull of a fish with only a relatively small fin for propulsion. This conserves energy stored in power container 27 and decreases size of twin-screw motors 24 and 26 that are required to propel this remote-control fishing vessel.

In all embodiments, the first and second water screws 17 and 18 can be surrounded by a water-screw net 40. This prevents entry of water plants or other debris likely to exist in locations where fish often feed and where remote-control fishing may be desirable.

Referring to FIGS. 11 and 12, the V-bottom ballast 3 can be double-ended and double-curved to form a hydrodynamic dihedral ballast 41. It can be similar in shape to bottoms of some small sailing boats with a maximum width and depth at approximately one-third of a distance from a bow section 42 to a stern section 43. Although the marine coefficient of drag is not as efficient for the hydrodynamic dihedral ballast 41 as for a double-ended long hull similar in shape to long ships and some long sail boats, it is several times more efficient than with a flat stern in contact with water. Consequently, the twin-screw motor 24 and 26 can be smaller yet and consume less stored energy. Another advantage of the hydrodynamic dihedral ballast 41 is that it allows the stern to tip down easily to where the broad transom 3 is in contact with the water when being pulled rearward by a hooked fish. The advantages of the broad transom 3 are thereby combined with the low-resistance advantages of the hydrodynamic dihedral ballast 41 for high water anchorage and propulsion efficiency for the same hull design.

Advantages of the hydrodynamic dihedral ballast 41, however, are for function rather than cost in comparison to the buoyant hulls 1 with the V-bottom ballast 2 described in relation to FIGS. 1-4 and the separate ballast 37 described in relation to FIGS. 6, 8 and 9. Simple and, therefore, less expensive embodiments can employ the simpler hulls. However, costs of the hydrodynamic dihedral ballast 41 can be diminished with high-volume production using mold and stamping techniques.

For maximum advantage, the hydrodynamic dihedral ballast 41 is constructed to provide sufficient buoyancy to support the buoyant hull 1 at a waterline connection 44 of the buoyant hull 1 and the hydrodynamic ballast 41. This waterline connection 44 can be rounded as shown in FIG. 12 for hydrodynamic efficiency.

Referring now to FIG. 13 in combination with FIGS. 1-6, 9-10 and 21-27, a standard hobby transmitter 45 can be employed for transmitting radio waves to a receiver antenna 19 for operating components that are controllable remotely. Four radio-wave channels of control are provided for four servomotors to remote-control components of various hobby related models. Two channels are provided for a first control stick 46 and two for a second control stick 47. Vertical motion controls one servomotor and horizontal motion controls a second servomotor with each control stick 46 and 47, making a total of four servomotors controllable with the two control sticks.

For this remote-control fishing vessel in particular, one control stick 46 or 47, depending on whether right-hand or left-hand steering is desired, can control both water screws 17 and 18. Y-axis motion of a first control stick 46 in a positive direction in relation to an X-axis, for instance, can be used for controlling rotational speed of both motors 24 and 26 in a forward direction. Neutral or central positioning of the control stick 46 would stop power in either direction to both motors 24 and 26. Y-axis motion of the same first control stick 46 in a negative direction in relation to the X-axis would reverse both motors 24 and 26. X-axis motion can be used to stop either motor. At the top of a Y-axis with a neutral X-axis, both engines would be at full speed ahead. Below the X-axis centerline of the first control stick 46, both motors 24 and 26 are reversed. Manipulation of the same control stick 46 to the right of a Y-axis centerline stops power to the right water screw 18 for a right turn by leaving power on for the left water screw 17. To turn left, the control stick 46 is traversed to a left side of a Y-axis position of the stick 46. X-axis and Y-axis movements are with reference to a central and upright position of either control stick 46 and 47.

Control of both motors 24 and 26 with one control stick, either 46 or 47, does not provide opposite-directional rotation of the two motors 24 and 26 for opposite-directional rotation of twin screws 17 and 18. To provide opposite-directional rotation for sharp turns, it is necessary to use a first control stick 46 for speed and directional control of a first motor 24 and the second control stick 47 for speed and directional control of the second motor 26. This could be achieved with Y-axis movement of either stick 46 or 47. X-axis movement of the sticks 46 and 47 would then be left available for operation of other remote-control components such as re-cocking the autohook fishing pole, controlling intensity of automatic jerk of a fishhook in a biting fish's mouth and controlling direction and speed of reel rotation. These will be described later in relation following figures.

A remote controller for a model vehicles is not the only remote controller that can be employed. It is just one alternative. Optionally, a remote controller with any number of control sticks or manipulators can be used. Another option is to provide radio signals separately to a servo motor for each positive and each negative travel of each of two or more control sticks. This would provide control of eight servo motors with the two control sticks for a remote controller like those used for model airplanes. This provides a very wide range of control of all controllable components. However, opposite-directional rotation of the twin screws 17 and 18 would still require separate control sticks 46 and 47. The function of a control stick 46 or 47 is to provide variable control of a servo motor that then operates directly or activates a separate power source to activate a component that is controllable remotely. Radio waves are transmitted from the remote controller 45 through a transmitter antenna 48 to receiver antenna 19 where the radio waves are then relayed through a relay 49, shown in FIGS. 1, 2, 4, 6, 10, 11 and 12, to various servomotors. The central-distribution controller 39, for instance, employs at least one servomotor for operating at least one mechanism for distributing fuel or electrical current to twin-screw motors 24 and 26.

Reference is made now to FIGS. 14-20 which describe, in greater detail than for FIGS. 1-4, the manual cocking and jerk-tension control of a pole rod 6 to which an autohook fishing pole 4 is attachable. In FIG. 14, a pole rod 6 is positioned between and attached pivotally to pole support 8 and pole support 9. In FIG. 14, the proximal end 11 of pole rod 6 is pressured downward by contraction spring 50 in contractional-tension communication between pole attachment 51 on the proximal end 11 of the pole rod 6 and a support attachment 52 that is attachable to the pole supports 8 and 9. In an aft end 53 of pole supports 8 and 9 are matching spring-attachment channels 54 into which the support attachment 52 is positioned selectively to regulate distance and resulting spring tension between the support attachment 52 and the pole attachment 51 with the contraction spring 50.

The pole rod 6, to which the autohook fishing pole 4 is attachable, is cocked by pivoting the distal end 5 of the pole rod 6 down and the proximal end 11 of pole rod 6 up to allow positioning of pole-rod latch 10 in pole-rod-latch notch 55. Downward pressure of the proximal end 11 of the pole rod 6 in pivotal travel actuated by contractional spring 50 causes a latch end 56 of the pole-rod latch 10 to be retained in the pole-rod-latch notch 55.

The pole rod 6 and autohook fishing pole 4 are trip-released or sprung by downward movement of a distal end 57 of the autohook fishing pole 4, shown in FIGS. 1, 6 and 11, by such force on line 13 as nibbling on bait on fishhook 12 by a fish. This raises the proximal end 11 of the pole rod 6 and allows the pole-rod latch 10 to fall by force of gravity in a direction of the buoyant hull 1. Immediately when there is a nibble pull, resulting from a tugging motion with which most fish bite, the autohook fishing pole 4 jerks upward and hooks the fish. The fishhook 12 is jerked precisely when the fish bites. There is no delay and the jerk is variable exactly for particular fish. This is a far more exact and immediate jerk than possible by an angler manually. It is truly an autohook fishing system.

The pole-rod latch 10 in FIGS. 1-3, 5, 6, 9, 14, 15, 17 and 18 is U-shaped with latch axles 58 extended inward into latch bearing orifices 59 in pole supports 8 and 9. This form of pole-rod latch 10 provides convenient manual access for cocking the pole rod 6. For remote-control cocking, however, a modified form of pole-rod latch 10 is preferable.

Jerk travel of the autohook fishing pole 4 is arrested at an end of a desired length by a pole-rod anvil 60 between the pole rod supports 8 and 9 at a position to arrest pole-rod 6 pivotal travel at a terminal end of a desired length of jerk travel of the autohook fishing pole 4. The pole-rod anvil 60 can be a rod or other buttress member that can be made to arrest pivotal travel of the pole rod 6 at approximately the same place.

The pole supports 8 and 9 are separate angled forms, such as sections of angle-iron beams, in FIGS. 2, 3, 5, 9, 12, 14, 15 and 17. Alternatively the pole supports 8 and 9 can be sides of a U-shaped form such as a section of channel iron as shown in FIGS. 16 and 18-23. The U-shaped form can be constructed more precisely for remote-control cocking as described in relation to FIGS. 21-23.

Figure 15:
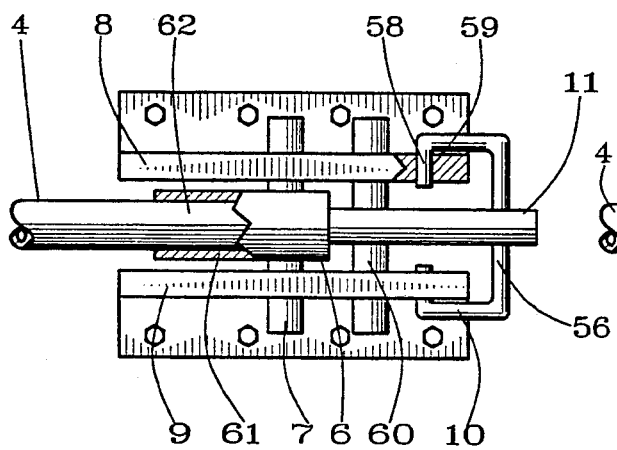
FIG. 15 is a top cutaway view of the FIG. 14 illustration.
Figure 16:
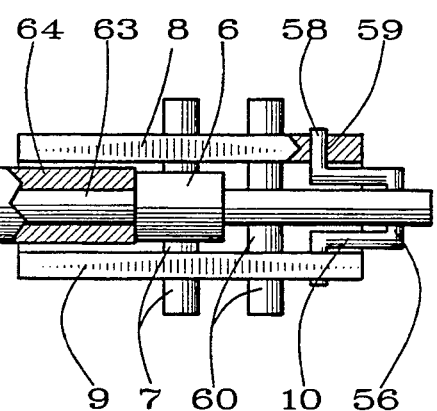
FIG. 16 is a top cutaway view of a pole-cocking mechanism having a channel-iron frame.

Shown in FIG. 15 is a distal end 5 of pole rod 6 having a pole-rod sleeve 61 into which a proximal end 62 of the autohook fishing pole 4 is insertional for attachment. Optionally as shown in FIG. 16, the pole rod 6 can be double-ended with a shaft distal end 63 that is insertional in a pole sleeve 64 in a the proximal end 62 of the autohook fishing pole 4. The latter attachment means can be produced at lower cost by some manufacturers.

Figure 20:
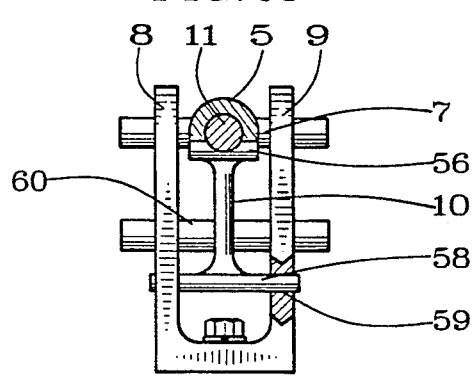
FIG. 20 is a partial cutaway front elevation view of a pole-cocking mechanism having an internal pole-rod latch with an I-shape for cocking an autohook fishing pole.

A U-shaped pole-rod latch 10 positioned between pole supports 8 and 9 with latch axles 58 extended outward into latch bearing orifices 59 is shown in FIGS. 16, 19 and 21-23. Although less accessible for manual cocking, this form is preferable for motorized cocking of the pole rod 6 by remote control. A further option is an I-shaped pole-rod latch 10 as shown in FIG. 20.

Figure 17:
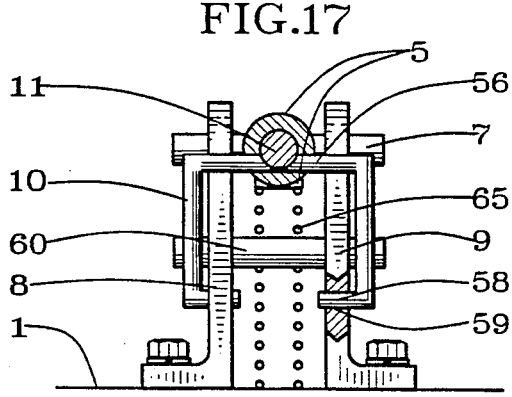
FIG. 17 is a partial cutaway front elevation view of a pole-cocking mechanism having dual angle irons as sides. It also employs an optional expansion spring in lieu of a contraction spring employed in the FIG. 14 illustration for jerking an autohook fishing pole automatically in a fish's mouth.
Figure 18:
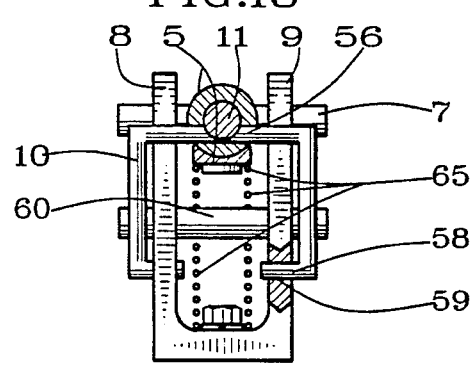
FIG. 18 is a partial cutaway front elevation view of a pole-cocking mechanism having a channel-iron frame and employing an expansion spring for operating the autohook fishing pole.
Figure 19:
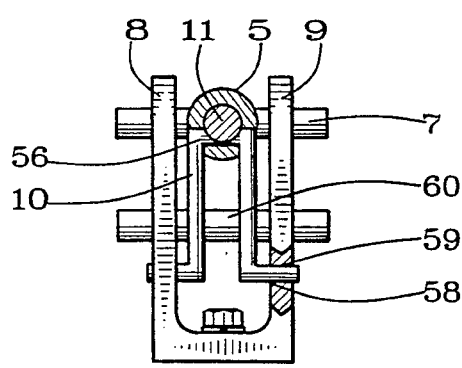
FIG. 19 is a partial cutaway front elevation view of a pole-cocking mechanism having an internal pole-rod latch with a U-shape for cocking an autohook fishing pole.

Downward pressure of the proximal end 11 of the pole rod 6 can be provided by an expansion spring 65 as shown in FIGS. 17 and 18. Although less expensive to produce without adjustability, this form of spring is more expensive to make adjustable.

Figure 21:
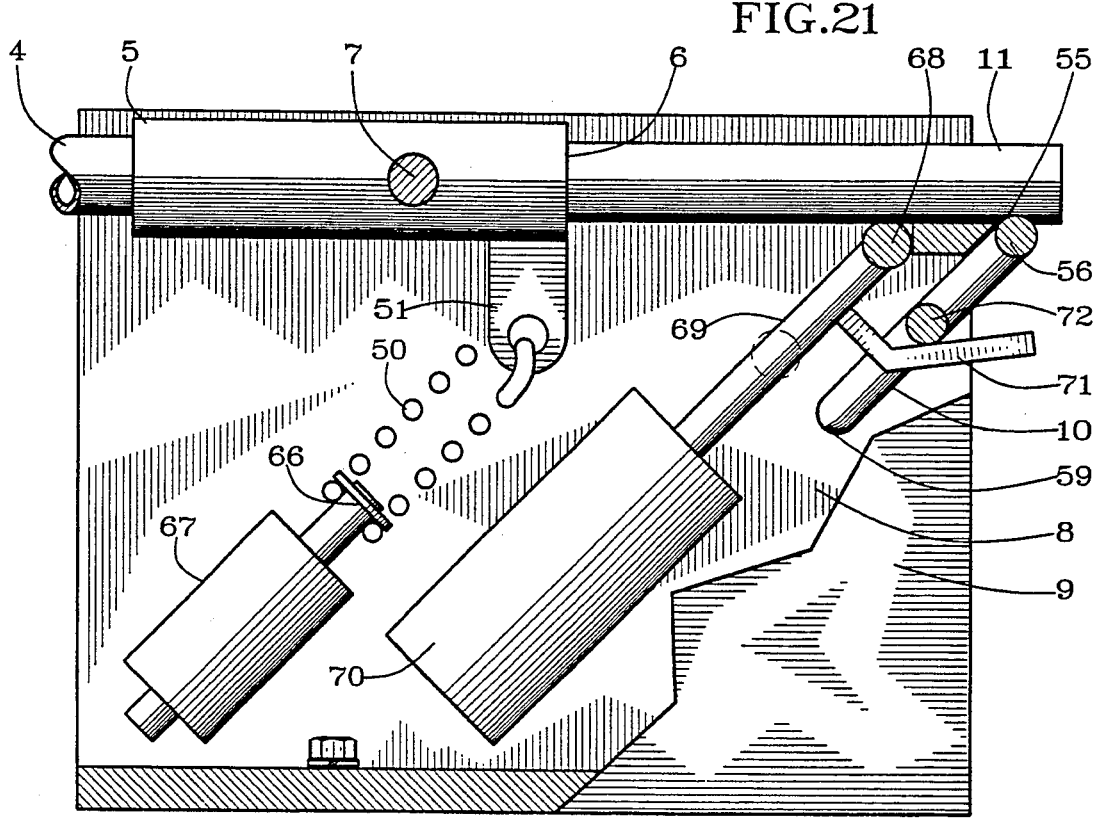
FIG. 21 is a cutaway side elevation view of a pole-cocking mechanism that is controllable remotely.
Figures 22, 23:
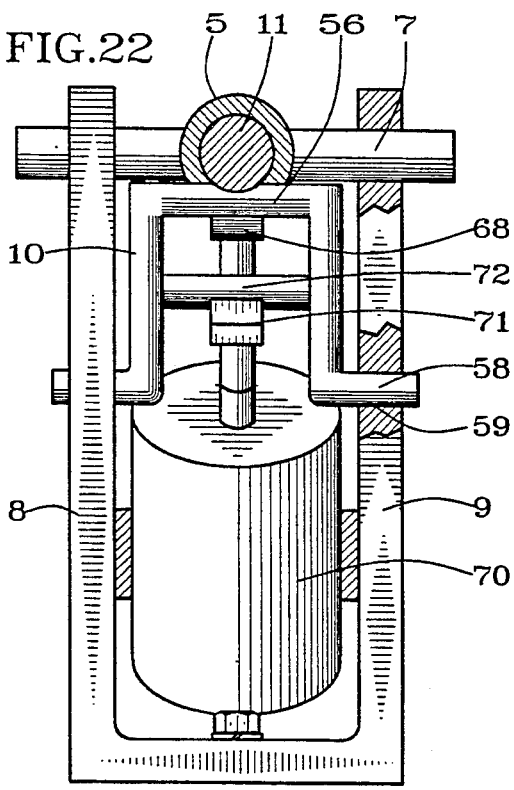
FIG. 22 is a partial cutaway front elevation view of the FIG. 21 illustration.
FIG. 23 is a rear elevation view of the FIG. 21 illustration.

Reference is made now to FIGS. 21-23 for description of an optional motorized pole-cocking mechanism with remote control. Spring tension for providing automatic jerk of autohook fishing pole 4 and for providing tension to maintain the latch end 56 of the pole-rod latch 10 in the pole-rod-latch notch 55 is provided with a motor-adjustable spring-attachment base 66 that is positioned in linearly-operative relationship to a tension-adjustment motor 67 between the pole supports 8 and 9. The motor-adjustable spring-attachment base 66 is attached to the contraction spring 50 opposite the end of the contraction spring 50 that is attachable to the pole attachment 51. The spring-adjustment motor 67 can be a linear electrical motor and the motor-adjustable spring-attachment base 66 can be attached directly to a linear output shaft of the electrical motor. Alternatively, the electrical motor can be rotational and the output shaft can be threaded to provide linear travel of the motor-adjustable spring-attachment base 66. Other motor-adjustable means are foreseeable within the intended scope of this invention. The tension-adjustment motor 67 is attached rigidly to the pole supports 8 and 9.

The pole rod 10 is pivoted to a position for cocking automatically by a reset-motor latch 68 on a pole-reset rod 69 in linearly operative relationship to a reset motor 70 which is positioned between and attached to the pole supports 8 and 9. As with the tension-adjustment motor 67, various forms of motors and mechanisms for linear power transfer can be employed. The reset-motor latch 68 is caused to engage a bottom surface of the proximal end 11 of the pole rod 6 and thereby cause it to pivot to a cocking position in which the latch end 56 of the pole-rod latch 10 enters the pole-rod-latch notch 55.

The pole-rod latch 10 is pivoted upward by a pole-rod-latch manipulator 71 that is extended from the pole-reset rod 69 in sliding contact with a pole-rod-latch lever 72 that is extended between legs of the pole-rod latch 10. The pole-rod-latch manipulator 71 is sized and shaped for sliding contact with the pole-rod-latch lever 72 simultaneously with contact of the reset-motor latch 68 with the proximal end 11 of the pole rod 6. A slant of the pole-rod-latch manipulator 71 maintains the pole rod 6 in a cocked position temporarily while the reset-motor latch 68 and the pole-rod-latch manipulator 71 are withdrawn from contact with the pole rod 6 and the pole-rod-latch lever 72 respectively by the reset motor 70 to leave the pole-rod latch 10 in a cocked relationship to the pole rod 6. In this way, the pole rod 6 is cocked in opposition to adjusted spring tension of contraction spring 50 by motorized means. The reset motor 70 and the tension-adjustment motor 67 both can be controlled remotely as described in relation to FIG. 13.

Reference is made now to FIGS. 24–27 for description of reel 14 for remote control. A reel axle 73 is rotatable by reel motor 74 through reduction gearing 75. Between the reduction gearing 75 and the reel axle 73 is an optional torsion-spring drive in the preferred form of a spiral gear spring 76 like a clock spring as shown in FIG. 24. Direct gear drive without the spiral gear spring 76 is shown in FIG. 25. FIGS. 26 and 27 show a reel 14 in either form.

The reel axle 73 can be positioned in rotational contact with opposite-end shaft housing 77 and 78 that can be employed for attachment of various aesthetic and functional reel housings. Reel flanges 79 can be employed to prevent line on the reel axle 73 from contacting shaft housing 77 and 78. A reel servomotor 80 can be employed for transmittal of operational direction from the remote controller 45 to the reel motor 74.

A spiral gear spring 76 can be employed by attachment of a reduction-gear axle 81 to spiral-spring housing 82. An outside end of a leaf-spring spiral 83 is attached to the spiral-spring housing 82 and an inside end of the leaf-spring spiral 83 is attached to spiral-gear shaft 84. The spiral-gear shaft 84 is attached to the reel axle 73.

The purpose of the spiral gear spring 76 is to cushion pull of a fish on a fishing line 13. This prevents jerking loose of a fishhook from a fish's mouth and breakage of fishing line when reeling in an active fish. The spiral gear spring 76 is constructed to allow a select number of rotations of the spiral gear shaft 84 in either direction with increasing tension against rotation before direct drive by the reduction-gear axle 81 is caused to continue direct drive. At this point a fish will have tired and will have experienced increase of pain from the fishhook and will be conditioned psychologically to yield to pull of the fishhook. Like breaking a wild horse in a relatively short time, a fish can be "broken" or conditioned to follow pull of a line being reeled in in this manner.

Optionally, however, the reel motor 74 can be rotated in either direction for some fish and for some fishing conditions. Also optionally, rotational speed and power of the reel motor 74 can be regulated remotely as desired by various angles for different fish and fishing conditions.

Linear positioning of the reel 14 can be in front of or aft of the pole rod 6 and its cocking mechanism. When positioned aft of the pole rod 6 as shown in FIG. 27, there is no need for routing line 13 between, under or around pole supports 8 and 9. When mounting the reel 14 in front of the pole rod 6 as shown in FIG. 26, the reel 14 can be recessed to more direct alignment with hull line eyes 15.

Various modifications may be made of the invention without departing from the scope thereof and it is desired, therefore, that only such limitations shall be placed thereon as are imposed by the prior art and which are set forth in the appended claims.

What is claimed is:

1. A remote-control fishing vessel comprising:
a buoyant hull having a stern with a broad transom,
a ballast extended downward vertically from a bottom of the buoyant hull,
an autohook fishing pole extendable rearward from a top portion of the buoyant hull,
a motorized reel mounted on the buoyant hull linearly to the autohook fishing pole,
a first water-screw propeller having a first propeller shaft projecting rearward from and in rotational contact with a right bottom portion of the buoyant hull,
a second water-screw propeller having a second propeller shaft projecting rearward from and in rotational contact with a left bottom portion of the buoyant hull,
a source of propulsive power positioned on the buoyant hull and having rotational power output transmittal equally to the first propeller shaft and to the second propeller shaft as desired for straight propulsion and having rotational power transmitted variably to the first propeller shaft and to the second propeller shaft as desired for steering propulsion of the buoyant hull, and
a remote controller of the rotational power output transmitted from the source of propulsive power to the first propeller shaft and to the second propeller shaft.

2. A remote-control fishing vessel as claimed in claim 1, wherein the buoyant hull is constructed of wood having a desired weight in comparison to weight of water to provide buoyancy.

3. A remote-control fishing vessel as claimed in claim 1, wherein the buoyant hull is constructed of foamed material having a desired weight in comparison to weight of water to provide buoyancy and is coated with a water-resistant material which is also an exoskeleton framework to which components of the remote-control fishing vessel can be attached.

4. A remote-control fishing vessel as claimed in claim 1, wherein the buoyant hull is constructed of a hollow-cellular material which resists passage of water throughout hollow cells in its hollow-cellular structure.

5. A remote-control fishing vessel as claimed in claim 4 and further comprising:
an exoskeleton framework on the hollow cellular material to which components of the remote-control fishing vessel can be attached.

6. A remote-control fishing vessel as claimed in claim 1, wherein the ballast is constructed of a material having a desired density for upright-positioning ballast and is attachable to the buoyant hull.

7. A remote-control fishing vessel as claimed in claim 6 and further comprising:
a hollow interior of a desired size in the ballast for containing select components and supplies for operating the remote-control fishing vessel.

8. A remote-control fishing vessel as claimed in claim 6 and further comprising:
a water-tight compartment positioned between a top of the buoyant hull and a select position within the ballast for containing components and supplies for operation of the remote-control fishing vessel.

9. A remote-control fishing vessel as claimed in claim 1, wherein the ballast is sized and shaped hydrodynamically with a maximum width proximate one-third of a distance from a bow of the buoyant hull to the stern of the buoyant hull, a pointed bow end proximate a bow end of the buoyant hull, a pointed stern end proximate the stern of the buoyant hull, sides having desired symmetrical curvatures between the pointed bow end and the pointed stern end, and a dihedral bottom edge having a desired curvature between the pointed bow end and the pointed stern end, a maximum radius of the curvature of the dihedral bottom edge being positioned proximate the maximum width of the ballast linearly.

10. A remote-control fishing vessel as claimed in claim 9, wherein the ballast has a weight which supports the buoyant hull with buoyancy of the ballast in water at a hull connecting section that is proximate a waterline of the ballast and the buoyant hull together such that the buoyant hull provides floatation for upright stability.

11. A remote-control fishing vessel as claimed in claim 10 and further comprising:
a transom plate extendable downward from the transom as desired to resist rearward travel of the remote-control fishing vessel when pulled by a fish caught on a line suspended from the autohook fishing pole.

12. A remote-control fishing vessel as claimed in claim 9 and further comprising:
a water-tight compartment positioned between a top of the buoyant hull and a select position within the ballast for containing components and supplies for operation of the remote-control fishing vessel.

13. A remote-control fishing vessel as claimed in claim 1, wherein the ballast is a V-shaped extension of the buoyant hull having a material with a desired density positioned in a bottom portion of the buoyant hull.

14. A remote-control fishing vessel as claimed in claim 1, wherein the autohook fishing pole is attachable pivotally to a pole axle between two pole supports that are extended upward from the buoyant hull.

15. A remote-control fishing vessel as claimed in claim 14, wherein the pole supports are separate plates with an angle plate extended at a right angle from each for attachment to a top surface of the buoyant hull.

16. A remote-control fishing vessel as claimed in claim 14, wherein the pole supports are opposite sides of a channel beam having a channel bottom wall attachable to a top surface of the buoyant hull.

17. A remote-control fishing vessel as claimed in claim 14, wherein the autohook fishing pole is attachable pivotally to the pole supports by attachment of the autohook fishing pole to a pole rod that is attachable pivotally to the pole supports and further comprising:
a pole-rod latch notch positioned near a proximal end and in a bottom portion of the pole rod,
a pole-rod axle on the pole rod with which the pole axle is attachable perpendicularly to the pole rod intermediate the proximal end and a distal end of the pole rod for pivotal attachment of the pole rod to the pole supports,
a pole-rod latch having an axle end attachable rotatively to at least one of the two pole supports and having an engagement end placeable in the pole-rod-latch notch when the pole rod is pivoted on the pole axle to a desired set angle in relation to a top surface of the buoyant hull and the pole-rod latch is positioned in an acute angle in relation to the top surface of the buoyant hull,
the engagement end of the pole-rod latch being retainable in the pole-rod-latch notch by downward pressure on the proximal end of the pole rod to prevent pivotal travel of the pole rod in a downward direction of the proximal end and an upward direction of the distal end of the pole rod,
the engagement end of the pole-rod latch being releasable from and allowed to fall out of the pole-rod-latch notch to allow pivotal travel of the pole rod in a downward direction of the proximal end and an upward direction of the distal end of the pole rod when downward force on the proximal end of the pole rod is overcome temporarily by downward force on the distal end of the pole rod by downward pull of fishing line on a fishing pole on the pole rod from such force as a fish nibbling on bait on a fishhook on the fishing line, and
the fishing pole being jerkable upward with force of a tension means with which the pole rod is forced in a pivotal direction against the engagement end of the pole-rod latch before the engagement end of the pole-rod latch is released from the pole-rod-latch notch in order to provide automatic jerk of the fishhook in a mouth of a fish when the fish nibbles on the bait on the fishhook.

18. A remote-control fishing vessel as claimed in claim 17, wherein the pole-rod latch is U-shaped and further comprising:
a latch-axle orifice positioned in each of the two pole supports,
each latch-axle orifice being concentric with the other,
a latch axle extended inward from a terminal end of each leg of the U-shaped pole-rod latch and insertional in a respective latch-axle orifice, and
a cross member of the U-shaped pole-rod latch that is a latch-engagement end of the U-shaped pole-rod latch that is insertional in the pole-rod-latch notch.

19. A remote-control fishing vessel as claimed in claim 17, wherein the pole-rod latch is U-shaped and further comprising:
a latch-axle orifice positioned in each of the two pole supports,
each latch-axle orifice being concentric with the other, a latch axle extended outward from a terminal end of each leg of the U-shaped pole-rod latch and insertional in a respective latch-axle orifice, and a cross member of the U-shaped pole-rod latch that is a latch-engagement end of the U-shaped pole-rod latch that is insertional in the pole-rod-latch notch.

20. A remote-control fishing vessel as claimed in claim 17, wherein the pole-rod latch is I-shaped and further comprising:

a latch-axle orifice positioned in each of the two pole supports, each latch-axle orifice being concentric with the other, a latch axle extended outward from a terminal end of each leg of a base of the I-shaped pole-rod latch and insertional in a respective latch-axle orifice, and a top cross member of the I-shaped pole-rod latch that is a latch-engagement end of the I-shaped pole-rod latch that is insertional in the pole-rod-latch notch.

21. A remote-control fishing vessel as claimed in claim 17, wherein the autohook fishing pole is attachable to the pole rod by insertion of the distal end of the pole rod into a fishing-pole sleeve in a proximal end of the autohook fishing pole.

22. A remote-control fishing vessel as claimed in claim 17, wherein the autohook fishing pole is attachable to the pole rod by insertion of the proximal end of the autohook fishing pole into a pole-rod sleeve in the distal end of the pole rod.

23. A remote-control fishing vessel as claimed in claim 17, wherein the downward force on the proximal end of the pole rod is provided by a contraction spring in contractional-tension communication between the proximal end of the pole rod and a member in contact with a top portion of the buoyant hull.

24. A remote-control fishing vessel as claimed in claim 17, wherein the downward force on the proximal end of the pole rod is provided by a contraction spring in contractional-tension communication between the proximal end of the pole rod and at least one pole support.

25. A remote-control fishing vessel as claimed in claim 24, wherein the downward force on the proximal end of the pole rod is provided by a contraction spring in contractional-tension communication between the proximal end of the pole rod and both of the two pole supports and further comprising:

a plurality of matching spring-attachment channels positioned consecutively one above the other in an edge of the pole supports, a spring pole attachment with which a pole end of the contraction spring is attachable to the proximal end of the pole rod, a spring support attachment with which a support end of the contraction spring is attachable selectively to either of the plurality of matching spring-attachment channels in the edge of the pole supports such that tension force of the contraction spring between the proximal end of the pole rod and the pole supports is adjustable in accordance with nearness of a selected spring-attachment channel to the proximal end of the pole rod and jerk of the autohook fishing pole is adjustable thereby for intensity of jerk of a hook in a fish's mouth when the fish nibbles on bait on a hook attached to fishing line suspended from the autohook fishing pole and unreeled from the motorized reel mounted on the buoyant hull linearly to the autohook fishing pole, and a pole-rod anvil between the pole supports at a position to arrest pole-rod pivotal travel at a terminal end of desired length of upward jerk travel of the autohook fishing pole.

26. A remote-control fishing vessel as claimed in claim 17, wherein the downward force on the proximal end of the pole rod is provided by an expansion spring in expansional-tension communication between the distal end of the pole rod and at least one pole support member.

27. A remote-control fishing vessel as claimed in claim 17, wherein the downward force on the proximal end of the pole rod is provided by an expansion spring in expansional-tension communication between the distal end of the pole rod and a top portion of the buoyant hull.

28. A remote-control fishing vessel as claimed in claim 17, wherein the downward pressure on the proximal end of the pole rod is provided by a contraction spring in contractional-tension communication between the proximal end of the pole rod and a motor-adjustable spring-attachment base that is moveable linearly in selective nearness to the proximal end of the pole rod such that movement of the motor-adjustable spring-attachment base in a direction away from the proximal end of the pole rod increases distance from the motor-adjustable spring-attachment base to the proximal end of the pole rod to increase contractional tension of the contraction spring and movement of the motor-adjustable spring-attachment base towards the proximal end of the pole rod decreases distance from the motor-adjustable spring-attachment base to the proximal end of the pole rod to decrease contractional tension of the contraction spring.

29. A remote-control fishing vessel as claimed in claim 28, wherein the motor-adjustable spring-attachment base is moveable selectively by a tension-adjustment motor.

30. A remote-control fishing vessel as claimed in claim 29 and further comprising:

a servomotor shaft extendable selectively and controllably from the tension-adjustment motor and attached to the motor-adjustable spring-attachment base.

31. A remote-control fishing vessel as claimed in claim 30, wherein the tension-adjustment motor is electrically controllable remotely with radio waves transmittable from a remote controller.

32. A remote-control fishing vessel as claimed in claim 17, wherein the engagement end of the pole-rod latch is placeable in the pole-rod-latch notch by a motorized latch manipulator attached to at least one of the pole supports.

33. A remote-control fishing vessel as claimed in claim 32, wherein the motorized latch manipulator is a reset motor having a linearly operative rod with a reset-motor latch which is caused to travel towards the pole-rod-latch notch to engage the pole-rod latch in travel from the disengagement end to the engagement end of pivotal travel of the pole-rod latch and then to retract to a position of non-contact of the reset-motor latch with the pole-rod latch.

34. A remote-control fishing vessel as claimed in claim 33, wherein the reset motor is an electrical motor that is controllable remotely by radio waves transmitted from a remote controller.

35. A remote-control fishing vessel as claimed in claim 34, wherein the downward pressure on the proximal end of the pole rod is provided by a contraction spring in contractional-tension communication between the proximal end of the pole rod and a motor-adjustable spring-attachment base that is moveable linearly in selective nearness to the proximal end of the pole rod such that movement of the motor-adjustable spring-attachment base in a direction away from the proximal end of the pole rod increases distance from the motor-adjustable spring-attachment base to the proximal end of the pole rod to increase contractional tension of the contraction spring and movement of the motor-adjustable spring-attachment base towards the proximal end of the pole rod decreases distance from the motor-adjustable spring-attachment base to the proximal end of the pole rod to decrease contractional tension of the contraction spring, and the motor-adjustable spring-attachment base is moveable by the tension-adjustment motor and the tension-adjustment motor is electrically controllable remotely with radio waves transmittable from a remote controller.

36. A remote-control fishing vessel as claimed in claim 17 and further comprising:

a pole-reset motor attachable to at least one of the two pole supports, a pole-reset rod operable in either direction of linear travel by the pole-reset motor, and a pole-reset latch on the pole-reset rod that is engageable with the proximal end of the pole rod at a released end of pivotal travel of the pole rod and disengageable with the proximal end of the pole rode at a cocked end of pivotal travel of the pole rod such that the pole rod can be maneuvered from a released end of pivotal travel by the pole-reset motor with the pole-reset latch on the pole-reset rod being engaged with the pole rod and then the pole-reset latch can be withdrawn from engagement with the proximal end of the pole rod to allow the pole rod to be trip-released by downward pull of a fish biting the bait on a fishhook on the fishing line.

37. A remote-control fishing vessel as claimed in claim 36, wherein the pole-reset motor is an electrical motor which is controllable remotely by radio waves from a controller.

38. A remote-control fishing vessel as claimed in claim 37, wherein the engagement end of the pole-rod latch is placeable in the pole-rod-latch notch by a pole-rod-latch manipulator extended from the pole-reset rod, the pole-rod-latch manipulator being sized and shaped to engage a pole-rod-latch lever on the pole-rod latch simultaneously with engagement of the pole-reset latch with the proximal end of the pole rod such that the pole rod is maneuvered to a set position and the pole-rod latch is maneuvered to a cocked position in the latch notch simultaneously, the pole-reset rod then being retractable by the pole-reset motor to withdraw the pole-reset latch from engagement with the proximal end of the pole rod and to withdraw the pole-rod-latch manipulator from engagement with the pole-rod-latch lever, and the pole-reset latch and the pole-rod-latch manipulator are retainable in restraining positions by the pole-reset rod and the pole-reset motor to restrain pivotal travel of the pole rod and the pole-rod latch respectively and then to re-engage the pole rod and the pole-rod latch respectively for subsequent re-cocking of the pole rod as desired.

39. A remote-control fishing vessel as claimed in claim 1, wherein the motorized reel is rotatable by an electrical reel motor having remote control through radio waves transmitted from a controller.

40. A remote-control fishing vessel as claimed in claim 39, wherein the electrical reel motor is reversible in direction of rotation and in speed of rotation.

41. A remote-control fishing vessel as claimed in claim 40, wherein the electrical reel motor is variable in power to overcome resistance to rotation by a fish caught on a fishhook on a line attached to the motorized reel.

42. A remote-control fishing vessel as claimed in claim 41 and further comprising:

a torsion spring in power-transmittal relationship between the electrical reel motor and a reel axle.

43. A remote-control fishing vessel as claimed in claim 42, wherein the torsion spring is a spiral leaf spring with a desired resiliency and having one end attached to a motor axle and an opposite end attached to the reel axle, such that a fish being reeled in by the motorized reel can unwind the torsion spring to a limited extent by pulling against the line till tiring increasingly with increasing tension of the spring and then can be pulled back rapidly without a jerk on a lodged hook in a manner that provides a rapid learning curve for a hooked fish not to fight pull of the line in addition to tiring the fish while reeling it in gently and safely.

44. A remote-control fishing vessel as claimed in claim 39 and further comprising:

a torsion spring in power-transmittal relationship between the electrical reel motor and a reel axle.

45. A remote-control fishing vessel as claimed in claim 44, wherein the torsion spring is a spiral leaf spring with a desired resiliency and having one end attached to a motor axle and an opposite end attached to the reel axle, such that a fish being reeled in by the motorized reel can unwind the torsion spring to a limited extent by pulling against the line till tiring increasingly with increasing tension of the spring and then can be pulled back rapidly without a jerk on a lodged hook in a manner that provides a rapid learning curve for a hooked fish not to fight pull of the line in addition to tiring the fish while reeling it in gently and safely.

46. A remote-control fishing vessel as claimed in claim 1 and further comprising:

a buoyant water-brake transom plate extendable pivotally from the broad transom to resist rearward pull of the remote-control fishing vessel by a hooked fish.

47. A remote-control fishing vessel as claimed in claim 1 and further comprising:

a watertight buoyancy member extended a select distance vertically from the top of the buoyant hull to offset a capsized attitude and allow the ballast to restore an upright attitude of the vessel from a possible capsized attitude under adverse operating conditions.

48. A remote-control fishing vessel as claimed in claim 47, wherein the watertight buoyancy member is a cover of a compartment in which components and supplies are positioned for operation.

49. A remote-control fishing vessel as claimed in claim 1 and further comprising:

a water screen positioned circumferentially to axes of the first water-screw propeller and the second water-screw propeller as desired to prevent entanglement by water plants and debris.

50. A remote-control fishing vessel as claimed in claim 1 and further comprising:

a radio-wave transmitter that is operable as a remote controller of remote-control components of the remote-control fishing vessel.

* * * * *